United States Patent [19]

Sarkisian et al.

[11] Patent Number: 4,542,628
[45] Date of Patent: Sep. 24, 1985

[54] COUPLED DUAL LOOP ABSORPTION HEAT PUMP

[75] Inventors: Paul H. Sarkisian, Watertown, Mass.; Robert C. Reimann, Lafayette; Wendell J. Biermann, Fayetteville, both of N.Y.

[73] Assignee: The United States of America as represented by the United States Department of Energy, Washington, D.C.

[21] Appl. No.: 670,099

[22] Filed: Nov. 13, 1984

[51] Int. Cl.⁴ ............................................. F25B 7/00
[52] U.S. Cl. ...................................... 62/335; 62/476
[58] Field of Search ............................. 62/335, 476

[56] References Cited

U.S. PATENT DOCUMENTS

| | | | |
|---|---|---|---|
| 3,483,710 | 12/1969 | Bearint | 62/335 X |
| 3,817,050 | 6/1974 | Alexander et al. | 62/476 X |
| 4,441,332 | 4/1984 | Wilkinson | 62/335 X |

Primary Examiner—Lloyd L. King
Attorney, Agent, or Firm—Robert H. Kelly

[57] ABSTRACT

A coupled dual loop absorption system which utilizes two separate complete loops. Each individual loop operates at three temperatures and two pressures. This low temperature loop absorber and condenser are thermally coupled to the high temperature loop evaporator, and the high temperature loop condenser and absorber are thermally coupled to the low temperature generator.

3 Claims, 2 Drawing Figures

COUPLED DUAL LOOP ABSORPTION HEAT PUMP

STATEMENT AS TO RIGHTS TO INVENTIONS MADE UNDER FEDERALLY SPONSORED RESEARCH AND DEVELOPMENT

The U.S. Government has rights in this invention pursuant to contract No. W-7405-ENG-26 awarded by the U.S. Department of Energy.

BACKGROUND OF THE INVENTION

This invention relates to an absorption machine and, more particularly, to an improved coupled dual loop absorption heat pump/refrigeration machine utilizing two separate complete single effect loops.

In a typical single effect absorption system, water may be the refrigerant and lithium bromide may be the absorbent, and together they are called a solution pair. Some systems employ high temperature solution pairs that are capable of operating at higher generator temperatures to increase efficiency but are precluded from operating at lower evaporator temperatures due to the possibility of freezing and crystallization of the solution pairs, while other chemical systems capable of operating at lower evaporator temperatures could not operate at the higher generator temperatures without chemical stability problems. Consequently, a single effect system is generally a compromise between higher and lower operating temperature conditions in the generator and evaporator.

Well known absorption cycles are mainly of a single effect type comprising a generator for heating a weak or relatively dilute absorbent solution to generate vapor of refrigerant, a condenser for condensing the vapor of refrigerant, an evaporator for evaporating the condensed refrigerant to provide cooling, and an absorber for absorbing the refrigerant vapor of the evaporator into a strong or relatively concentrated absorbent solution. However, the thermal efficiency (coefficient of performance or COP) of a single effect type absorption system is relatively low and ordinarily about 0.6-0.7. With a view toward increasing the thermal efficiency of absorption cycles, double effect type absorption units have been developed in which a second generator is additionally provided in the single effect type absorption unit such that the high temperature vapor of refrigerant generated in a first generator is utilized to heat a second generator.

In general, the double effect type absorption unit comprises a high temperature generator and a low temperature generator whereby the external heat supplied is utilized twice in the high and low temperature generators and so the thermal efficiency increases in comparison with the single effect type system.

An improvement of the double effect type absorption unit has been the dual loop system. The absorption system in U.S. Pat. No. 3,483,710 is a prior art version of a two loop system that combines a higher temperature loop with a lower temperature loop. Although this prior art discloses a high temperature condenser in heat exchange relation with a low temperature generator, it fails to teach the relationship between the other components in both loops.

SUMMARY OF THE INVENTION

The present invention is directed to an improved coupled dual loop absorption heat pump/refrigeration cycle which utilizes two separate complete loops. Each individual loop operates at three temperatures within a temperature range and two pressures within a pressure range. The pressures of either loop can be greater than the pressures of the other loop depending upon the fluids employed.

When the generator/condenser pressures are higher than the absorber/evaporator pressures, the cycles are the conventional ones found in heat pumps and air conditioners, and heat is input at the two temperature extremes of each loop and is rejected at the middle temperatures. When the pressures are reversed, the heat input and rejection is also reversed, and the cycles form a heat transformer or temperature booster.

In a preferred embodiment, the evaporator of the first loop is fired by part of the heat rejected by the condenser and absorber of the second loop, while the generator of the second loop is fired by the total heat rejected by the condenser and absorber of the first loop. Further, since the coupling between the two individual loops is across heat exchanger surfaces only, the present invention allows the use of separate refrigerant/absorbent combinations in each loop. The use of separate combinations in each loop permits the use of a working fluid in each loop that is best suited to the temperature/pressure levels in that loop.

Accordingly, it is an object of the present invention to provide an absorption heat pump/refrigeration system with both heating and cooling efficiencies advanced beyond current commercial offerings.

It is another object of the present invention to provide an absorption system that extends the operaitng temperature region higher and lower than current cummercial offerings.

The various features of novelty which characterize the invention are pointed out with particularity in the claims annexed to and forming a part of this specification. For a better understanding of the invention, its operating advantages and specific objects attained by its use, reference should be had to the accompanying drawings and descriptive matter in which there is illustrated and described a preferred embodiment of the invention.

BRIEF DESCRIPTION OF THE DRAWINGS

In the accompanying drawings, forming a part of this specification, and in which reference numerals shown in the drawings designate like or corresponding parts throughout the same.

DESCRIPTION OF THE PREFERRED EMBODIMENT

Figure 1:
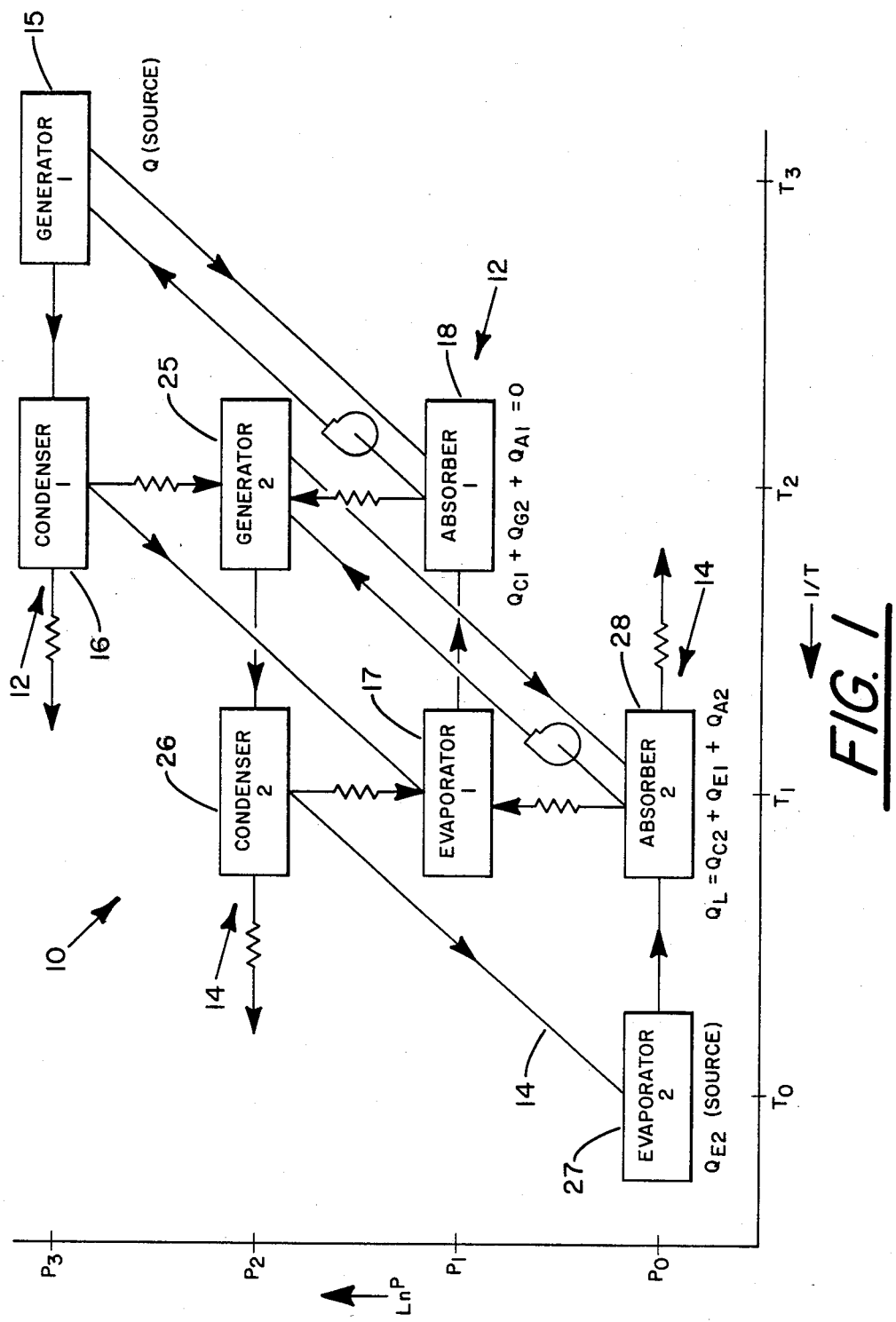
FIG. 1 is a schematic representation of a dual loop system of the present invention in the cooling mode.

FIG. 1 illustrates a schematic representation of a dual loop absorption machine 10. The machine 10 generally comprises two single effect loops thermally coupled to transfer heat therebetween. The present machine comprises a high temperature loop 12 or upper loop or stage, and a lower temperature loop 14 or lower loop or stage. This schematic representation is shown within a coordinate system having increasing temperature form left to right along the abscissa and increasing pressure from bottom to top along the ordinate. Accordingly, the upper limit of the high temperature loop 12 is at a higher relative temperature than the upper limit of the lower temperature loop 14. It is noted, however, that the upper loop pressures are not necessarily higher than the lower loop pressures. The typical high temperature loop 12 comprises a high temperature generator 15, a high temperature condenser 16, a high temperature evaporator 17, and a high temperature absorber 18, while the low temperature loop 14 comprises a low temperature generator 25, a low temperature condenser 26, a low temperature evaporator 27, and a low temperature absorber 28. The high temperature and low temperature loops are coupled so that the low temperature condenser 26 and low temperature absorber 28 are thermally coupled with the high temperature evaporator 17. The algebraic sum of these three heat quantities is equal to the heat delivered to the load. The second thermal coupling point between the high temperature and low temperature loops is through the use of rejected heat from the high temperature absorber and high temperature condenser as input heat for the low temperature generator. The operating conditions are chosen so that the algebraic sum of these heats is zero. Thus the heat to the low temperature generator 25 will be generally twice that to the high temperature generator 15 giving an enhanced thermal efficiency.

Figure 2:
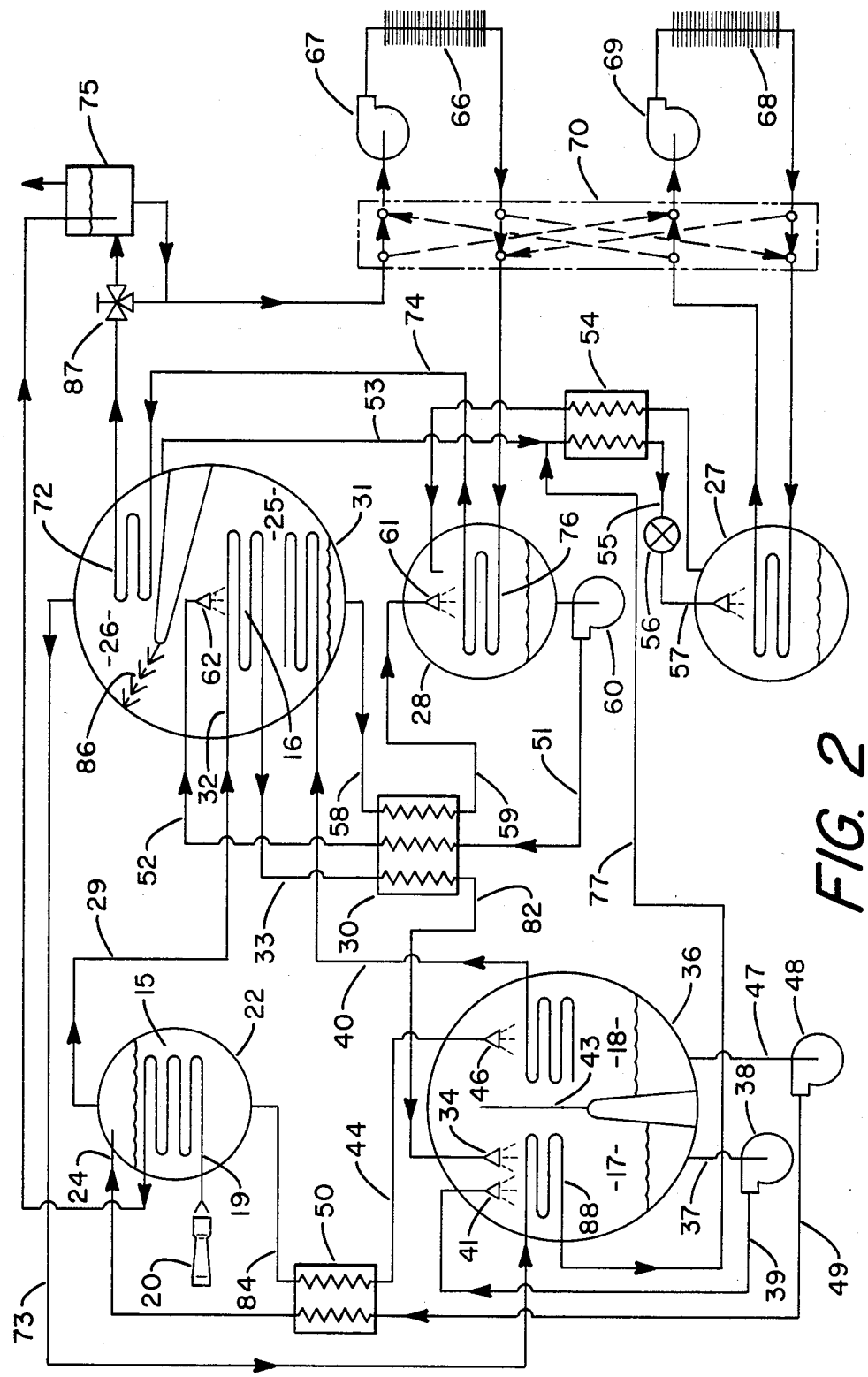
FIG. 2 is a diagrammatic view of a dual loop system of the present invention in the heating mode.

Referring now to FIG. 2, high temperature generator 15 is contained within a shell 22 and is heated by combustion gases from burner 20 which flow through conduit 19. Heat is transferred from the combustion gases in conduit 19 to a weak absorbent solution being discharged from conduit 24. The heat concentrates the weak solution by removing refrigerant therefrom. The released refrigerant vapor flows from the high temperature generator 15 through conduit 29 into low temperature generator 25 which is within shell 31. The vaporized refrigerant is condensed within conduit means 32 through a portion of low temperature generator 25 and discharged to low temperature solution and condensate heat exchanger 30 by way of conduit means 33. The refrigerant flows from low temperature solution and condensate heat exchanger 30 through conduit 82 and is discharged through spray header 34 into high temperature evaporator 17. The condensed refrigerant within shell 36 is recirculated through conduit 37 by high temperature refrigerant pump 38 by way of conduit 39 through spray header 41 back to the high temperature evaporator 17.

Vaporized refrigerant within shell 36 flows through opening 42 in partition 43 which separates the high temperature evaporator 17 from the high temperature absorber 18, where it weakens the strong solution supplied to the high temperature absorber 18 from high tempersture generator 15 by way of conduit means 84, high temperature solution heat exchanger 50 and conduit 44 through spray header 46.

In the high temperature loop 12 the weak absorbent solution in high temperature absorber 18 is pumped therefrom by high temperature solution pump 48 by way of conduit means 47, 49, and 24, through high temperature solution heat exchanger 50 to high temperature generator 15, thus completing the fluid flow through high temperature loop 12.

In operation, the low temperature generator 25 is in heat transfer relationship with conduit 32 of high temperature condenser 16 and heat pipe 40 of high temperature absorber 18. The heat pipe 40 is a closed loop heat exchanger well known in the art and serves to provide heat exchange between high temperature absorber 18 and low temperature generator 25.

In the low temperature loop 14 (as shown in FIG. 1) the low temperature absorber 28 is connected to low temperature generator 25 through low temperature solution and condensate heat exchanger 30 by weak solution conduit means 51 and 52, and strong solution conduit means 58 and 59. The low temperature generator 25 is connected to low temperature partial condenser 26 within shells 31 through demister 86, and to low temperature partial condenser 88 within shell 36 by conduit 73. The low temperature condenser outlets are connected through liquid vapor interchanger 54 by conduits 53, 55, 73 and 77 to expansion valve 56 and to the low temperature evaporator 27 by conduit means 57.

In the lower loop 14 (shown in FIG. 1) strong absorbent solution flows from low temperature generator 25 through low temperature solution and condensate heat exchanger 30 by conduit means to spray header 61 into low temperature absorber 28 where it absorbs refrigerant and the resulting weak solution is pumped through low temperature solution and condensate heat exchanger 30 and spray header 62 by low temperature solution pump 60. Heat is removed from the vaporized refrigerant flowing from the low temperature evaporator 27 to the low temperature absorber 28 by liquid vapor interchanger 54.

In the heating mode (as shown by the solid arrows) indoor coil 66 transfers heat from absorption cycle 40 to the conditioned space while outdoor coil 68 transfers heat from the outdoor ambient to the absorption cycle. A secondary fluid is circulated through the indoor and outdoor coils to accomplish this by loop pumps 67 and 69 respectively which are connected through a dual four-way heat/cool valve 70. In the cooling mode (as shown by the dashed arrows) the heat/cool valve 70 is reversed and the functions of the indoor and outdoor coil are also reversed.

An exemplary recuperator 75 is also shown, which supplements heat to the load with recovered heat from the flue gas leaving conduit 19 in the heating mode. Bypass valve 87 is provided so that the recuperator 75 is not operational in the cooling mode.

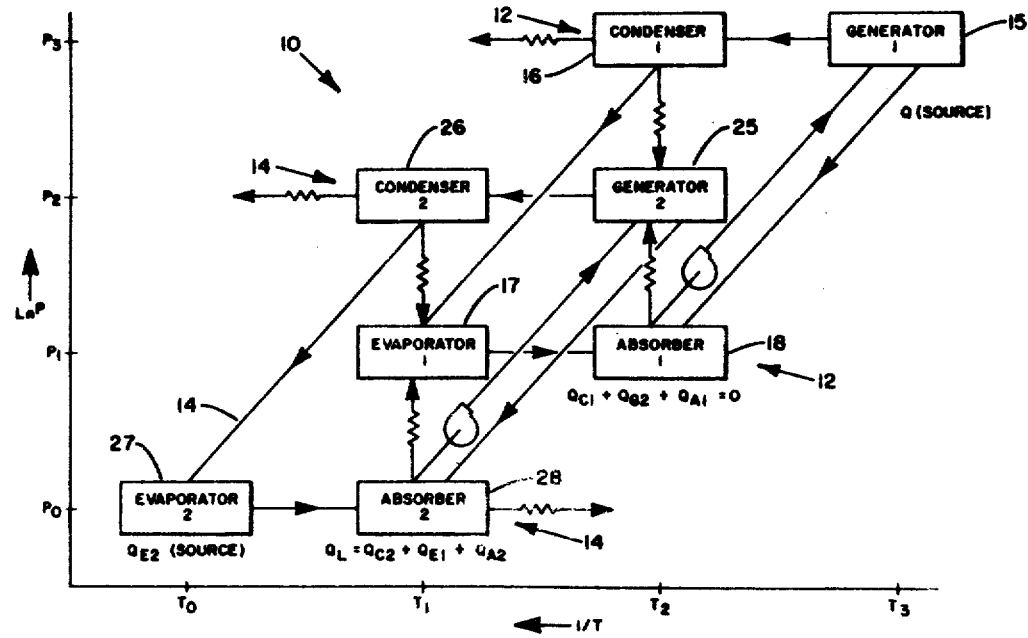

What is claimed is:

1. An absorption heat pump/refrigeration system comprising:
   a first absorption system loop for operation within a first temperature range;
   a second absorption system loop for operation at a second lower temperature range relative to said first loop;
   said first loop having generator means, condenser means, evaporator means, and absorber means operatively connected together;
   said second absorption system having generator means, condenser means, evaporator means, and absorber means operatively connected together; and
   said first loop condenser means and said first loop absorber means in heat exchange relationship with said second loop generator means.

2. The absorption heat pump/refrigeration system as recited in claim 1 wherein said second loop condenser means is in heat exchange relation with said first loop evaporator means.

3. The absorption heat pump/refrigeration system as recited in claim 2 wherein said second loop absorber means is in heat exchange relation with said first loop evaporator means.

* * * * *

UNITED STATES PATENT AND TRADEMARK OFFICE
CERTIFICATE OF CORRECTION

PATENT NO. : 4,542,628

DATED : September 24, 1985

INVENTOR(S) : Paul H. Sarkisian, Robert C. Reimann and Wendell J. Biermann

It is certified that error appears in the above-identified patent and that said Letters Patent are hereby corrected as shown below:

The title page should be deleted to appear as per attached title page.

Signed and Sealed this

Fourteenth Day of January 1986

[SEAL]

Attest:

DONALD J. QUIGG

Attesting Officer

Commissioner of Patents and Trademarks

United States Patent

Sarkisian et al.

Patent Number: 4,542,628
Date of Patent: Sep. 24, 1985

[54] COUPLED DUAL LOOP ABSORPTION HEAT PUMP

[75] Inventors: Paul H. Sarkisian, Watertown, Mass.; Robert C. Reimann, Lafayette; Wendell J. Biermann, Fayetteville, both of N.Y.

[73] Assignee: The United States of America as represented by the United States Department of Energy, Washington, D.C.

[21] Appl. No.: 670,099

[22] Filed: Nov. 13, 1984

[51] Int. Cl.³ ............................................ F25B 7/00
[52] U.S. Cl. .................................... 62/335; 62/476
[58] Field of Search ............................. 62/335, 476

[56] References Cited

U.S. PATENT DOCUMENTS

| 3,483,710 | 12/1969 | Bearint | 62/335 X |
| 3,817,050 | 6/1974 | Alexander et al. | 62/476 X |
| 4,441,332 | 4/1984 | Wilkinson | 62/335 X |

Primary Examiner—Lloyd L. King
Attorney, Agent, or Firm—Robert H. Kelly

[57] ABSTRACT

A coupled dual loop absorption system which utilizes two separate complete loops. Each individual loop operates at three temperatures and two pressures. This low temperature loop absorber and condenser are thermally coupled to the high temperature loop evaporator, and the high temperature loop condenser and absorber are thermally coupled to the low temperature generator.

3 Claims, 2 Drawing Figures